3,073,864
DIMERIC FATTY QUATERNARY AMMONIUM SALTS
Stuart A. Harrison, Kirtland E. McCaleb, and William J. Ward, Minneapolis, Minn., assignors to General Mills Inc., a corporation of Delaware
No Drawing. Filed Oct. 16, 1957, Ser. No. 690,433
3 Claims. (Cl. 260—567.6)

This invention relates to new and useful quaternary ammonium compounds prepared from polymeric fat acid amines.

Polymeric fat acids are well known commercially available acids, and the polymeric fat acid amines used in this invention have essentially the same structure except that the —COOH groups have been replaced by —$CH_2NH_2$ groups. As such, they may be prepared directly from polymeric fat acids by reacting these acids with ammonia to produce the corresponding nitrile and subsequently hydrogenating the nitrile to the corresponding amine. Likewise, it is possible to prepare similar polymeric fat acid amines by the polymerization of suitable fatty nitriles followed by hydrogenation of the polymeric nitrile to the polymeric fat acid amine.

In any case, the basic raw materials for the preparation of the polymeric fat acid amines are fatty acids having sufficient double bond functionality to form the polymeric material. An ideal starting material for thermal polymerization is pure linoleic acid. It will be appreciated, however, that the acids employed occur in nature as complex mixtures and isolation of pure linoleic acid is, as a practical matter, commercially unfeasible. Instead, sources rich in linoleic acid (30 to 80%) are employed as the starting acids. One analytical method for describing mixtures of fatty acids having sufficient double bond functionality is by reference to its iodine number, i.e., the number of grams of iodine equivalent to the halogen absorbed by a 100 gram sample. Generally speaking, acids having an iodine number of at least 120 will have sufficient double bond functionality to form the desired polymer. Illustrative sources of suitable acids are soybean, linseed, tung, perilla, cottonseed, corn, sunflower, safflower, and dehydrated castor oil as well as tall oil. Furthermore, linoleic acid-rich fatty acids may be obtained from these various sources by crystallization and/or distillation. Instead of thermal polymerization, any other method of polymerization such as that disclosed in U.S. Patent 2,793,219 may be used and even methods of polymerizing monounsaturated acids may be used.

Polymeric fat acid amines prepared as shown above may be quaternized with various quaternary salt-forming substances to form the compounds of this invention. These quaternary salt-forming compounds include methyl chloride, methyl bromide, methyl iodide, ethyl chloride, ethyl bromide, ethyl iodide, n-propyl chloride, n-propyl bromide, n-propyl iodide, isopropyl bromide, n-butyl chloride, n-butyl bromide, isobutyl bromide, sec.-butyl bromide, n-amyl bromide, n-hexyl chloride, benzyl chloride, benzyl bromide, methyl sulfate, ethyl sulfate, methyl benzenesulfonate, methyl p-toluenesulfonate, etc. which will react directly with the polymeric fat acid amines described above to give respectively the methochloride, methobromide, methiodide, ethochloride, ethobromide, ethiodide, n-propochloride, n-propobromide, n-propiodide, isopropobromide, n-butochloride, n-butobromide, isobutobromide, sec.-butobromide, n-amobromide, n-hexochloride, benzochloride, benzobromide, methosulfate, ethosulfate, methobenzenesulfonate, metho-p-toluenesulfonate, etc. as the quaternary compounds. The preferred groups on the nitrogen atoms are aliphatic hydrocarbon groups of 1–6 carbon atoms.

The quaternary reaction is preferably carried out in the presence of a solvent such as an alcohol in which the polymeric fat acid amine is soluble. Isopropyl and butyl alcohols are preferred solvents. Numerous other solvents are, however, useful as are combinations of solvents such as alcohol-hydrocarbon mixtures. In general, the solvent does not appear to influence the reaction markedly, and is desirable only to effect a more intimate contact between the alkylating agent and the amine.

The reaction may be carried out in the presence of a base, such as the alkali metal hydroxides, alkaline earth hydroxides, alkali metal carbonates, alkali metal alkoxides and the like. These serve to take up any acid liberated in the quaternization reaction. If such a base is not used, the amine groups of the amine serve as acceptors for the acid produced by the reaction. For example, if no base is used and an alkyl halide is employed for quaternization, the acidic material will be a hydrohalide which reacts with the amine groups present to form a salt. In this case, the quaternization is only partial, since some of the amine groups serve as acceptors for the byproducts of the reaction. This is a means of controlling the degree of quaternization in the event that less than complete quaternization is desired.

This invention may be illustrated further by reference to the following examples in which all "parts" are expressed as parts by weight and all "percentages" are expressed as percent by weight, unless specified otherwise.

EXAMPLE I

Two hundred parts of polymeric fat acid amines, prepared by reacting polymeric fat acids containing a preponderance of di-linoleic acid with ammonia to form the corresponding nitrile and hydrogenating the nitrile to the amine, 17 parts of a 57% aqueous sodium hydroxide solution, and 190 parts of isopropanol were charged into an autoclave. The autoclave was sealed, agitation was started, and methyl chloride dded so as to keep the pressure in the range of 80–120 p.s.i. with the temperature being in the range of 105° to 130° C. At the end of 1⅔ hours the pressure remained constant without the addition of more methyl chloride. At this time the vessel was cooled to 75° to 80° C. and the gases vented. The reaction mixture was filtered to remove NaCl formed during the reaction and the precipitate washed with 50 cc. of isopropanol. The filtrate and the 50 cc. of wash isopropanol were combined to yield a clear liquid containing approximately 50% of the resulting polymeric fat acid amine quaternary ammonium compound.

EXAMPLE II

The polymeric fat amine quaternary ammonium compounds prepared as shown in Example I was found to be effective as a paper softener. When added to the pulp before the preparation of hand sheets, it was found to soften the hand sheets and at the same time eliminated certain difficulties encountered with other softeners. The addition of this quaternary ammonium compounds to the pulp and the customary working up of the pulp into a hand sheet did not result in any difficulty with foam formation as was encountered when a difatty dimethyl quaternary ammonium chloride was used. Moreover, the sheet formed from the pulp containing the polymeric fat acid amine quaternary ammonium compounds did not shed a fuzzy lint when handled as did the sheet prepared from the difatty dimethyl quaternary ammonium compound.

An even more significant advantage, however, is the fact that the polymeric fat acid amine quaternary ammonium compounds did not reduce the bursting strength to anywhere near the extent that the difatty dimethyl quaternary ammonium chloride did.

The following data show the effect on bursting strength between the two compounds treated.

*Table I*

| Percent of reagent added | Bursting Strength in Arbitrary Units | | | | |
|---|---|---|---|---|---|
| | 0 | 0.5 | 1.0 | 2.5 | 3.0 |
| Polymeric Fat Acid Amine Quaternary Ammonium Compounds | 115 | 84 | 83 | 88 | 82 |
| Dihydrogenated Tallow Dimethyl Quaternary Ammonium Chloride | 115 | 69 | 56 | 45 | 35 |

It will be noted that the polymeric fat amine quaternary ammonium compounds gave a bursting strength which was relatively constant regardless of the quantity of the quaternary, while the other quaternary decreased the strength of the hand sheet almost in direct proportion to the level of material present.

Many modifications and variations of the invention as hereinbefore set forth may be made without departing from the spirit and scope thereof, and therefore only such limitations should be imposed as are indicated in the appended claims.

Now, therefore, we claim:

1. A polyquaternary ammonium compound represented by the formula $$R(CH_2N^+(R')_3X^-)_n$$

in which R is the hydrocarbon radical of the polymeric fat acid $R(COOH)_n$; R' is an aliphatic hydrocarbon group of from 1–6 carbon atoms; X is a salt forming group and $n$ is from 2–3.

2. A polyquaternary ammonium compound having the formula:

$$X^-(R')_3N^+CH_2-R-CH_2N^+(R')_3X^-$$

in which R is the divalent hydrocarbon radical of the polymeric fat acid HOOC—R—COOH, R' is an aliphatic hydrocarbon group of from 1–6 carbon atoms, and X is a salt forming group.

3. A polyquaternary ammonium compound having the formula:

$$Cl^-(CH_3)_3N^+CH_2-R-CH_2N^+(CH_3)_3Cl^-$$

in which R is the hydrocarbon radical of the polymeric fat acid HOOC—R—COOH.

References Cited in the file of this patent

UNITED STATES PATENTS

| 2,366,727 | Gunderson | Jan. 9, 1945 |
| 2,525,777 | De Benneville | Oct. 17, 1950 |
| 2,565,529 | Smith | Aug. 28, 1951 |
| 2,592,273 | Goebel et al. | Apr. 8, 1952 |
| 2,812,350 | Niederhauser | Nov. 5, 1957 |

OTHER REFERENCES

Schmidt et al.: Chemical Abstracts, vol. 44, pages 6474, 6475 (1950). (Copies may be obtained in Sci. Library.)

Schiels et al.: Chemical Abstracts, vol. 46, page 5788 (1952).

UNITED STATES PATENT OFFICE
CERTIFICATE OF CORRECTION

Patent No. 3,073,864                      January 15, 1963

Stuart A. Harrison et al.

It is hereby certified that error appears in the above numbered patent requiring correction and that the said Letters Patent should read as corrected below.

Column 2, line 1, for "quaternary" read -- quaternization --; line 35, for "17" read -- 107 --; line 38, for "dded" read -- added --; column 3, line 30, and column 4, lines 5 and 12, in the formulae, for "N+" each occurrence, read --
$\overset{+}{N}$ --.

Signed and sealed this 3rd day of September 1963.

(SEAL)
Attest:

ERNEST W. SWIDER
Attesting Officer

DAVID L. LADD
Commissioner of Patents